US011174774B2

(12) United States Patent
Richardson

(10) Patent No.: US 11,174,774 B2
(45) Date of Patent: Nov. 16, 2021

(54) STRUCTURES FOR CATALYTIC CONVERTERS

(71) Applicant: Imagine TF, LLC, Campbell, CA (US)

(72) Inventor: Brian Edward Richardson, Los Gatos, CA (US)

(73) Assignee: Imagine TF, LLC, Campbell, CA (US)

( * ) Notice: Subject to any disclaimer, the term of this patent is extended or adjusted under 35 U.S.C. 154(b) by 0 days.

(21) Appl. No.: 16/707,398

(22) Filed: Dec. 9, 2019

(65) Prior Publication Data

US 2020/0131967 A1 Apr. 30, 2020

Related U.S. Application Data

(63) Continuation-in-part of application No. 16/172,732, filed on Oct. 27, 2018, now Pat. No. 10,774,717.

(60) Provisional application No. 62/917,497, filed on Dec. 11, 2018.

(51) Int. Cl.
*F01N 3/28* (2006.01)
*F01N 3/021* (2006.01)

(52) U.S. Cl.
CPC .......... *F01N 3/2839* (2013.01); *F01N 3/0211* (2013.01); *F01N 2330/101* (2013.01); *F01N 2330/324* (2013.01)

(58) Field of Classification Search
None
See application file for complete search history.

(56) References Cited

U.S. PATENT DOCUMENTS

| | | | | |
|---|---|---|---|---|
| 5,593,645 A | * | 1/1997 | Steenackers | F01N 3/281 422/176 |
| 5,611,831 A | * | 3/1997 | Matsuoka | B01D 46/0063 55/486 |
| 5,961,931 A | * | 10/1999 | Ban | B01D 39/2041 422/171 |
| 7,877,989 B1 | * | 2/2011 | Kirsch | F01N 3/0212 60/311 |
| 2004/0128988 A1 | * | 7/2004 | Frankle | B01D 46/0001 60/297 |
| 2010/0319314 A1 | * | 12/2010 | Noller | F01N 3/2839 60/272 |
| 2011/0041469 A1 | * | 2/2011 | Fischer | B01D 46/2411 55/498 |
| 2013/0034472 A1 | * | 2/2013 | Cantrell | B01D 53/9422 422/177 |
| 2013/0136664 A1 | * | 5/2013 | Bono | B01J 23/72 422/180 |
| 2014/0294670 A1 | * | 10/2014 | Wiget | E04H 1/1277 422/33 |
| 2017/0282124 A1 | * | 10/2017 | Bischof | B01J 37/0203 |
| 2018/0353905 A1 | * | 12/2018 | Li | B01J 23/44 |

* cited by examiner

*Primary Examiner* — Jelitza M Perez
(74) *Attorney, Agent, or Firm* — Keith Kline; The Kline Law Firm PC

(57) ABSTRACT

Various structures for catalytic convertors are disclosed herein. The device includes an outer housing enclosing a catalytic core. The catalytic core can be formed in a myriad of ways. Flow paths through the core are constructed so that they are not straight-line paths from the inlet of the device to the outlet of the device. Pleated conformations and stacked core arrays are described that maximize the catalytic surface area in a given volume of housing. The application of the core to exhaust from diesel engines is also disclosed.

20 Claims, 14 Drawing Sheets

STRUCTURES FOR CATALYTIC CONVERTERS

CROSS REFERENCE TO RELATED APPLICATIONS

This application claims the priority benefit of U.S. patent application Ser. No. 16/172,732, filed on Oct. 27, 2018, of which this application is a continuation-in-part, and the priority benefit of U.S. Provisional Application 62/917,497, filed on Dec. 11, 2018. The disclosures of the aforementioned applications are hereby incorporated by reference in their entireties, including all references and appendices cited therein, for all purposes.

FIELD OF THE DISCLOSURE

The present disclosure relates generally to fluidic architectures for the conversion of harmful gases to gases that are not harmful, and more specifically to the catalytic conversion of exhaust gases from internal combustion engines.

SUMMARY

In various embodiments of the present disclosure, catalytic convertor devices include a housing and a convertor core. The convertor core includes at least one catalytic core. Both the convertor core and the housing have an inlet side and an outlet side. The convertor core further includes at least one catalytic core, the catalytic core having openings that form fluid flow paths. The openings are staggered from the inlet side to the outlet side so that no fluid flow path is a straight line. This maximizes exposure of inlet harmful gases to catalytic surfaces by minimizing a boundary layer and providing configurations that maximize the exposure of virgin harmful gases to the catalytic surfaces in the catalytic core, the catalytic core having openings that form fluid flow paths. The openings are staggered from the inlet side to the outlet side so that no fluid flow path is a straight line. This maximizes exposure of inlet harmful gases to catalytic surfaces by minimizing a boundary layer and providing configurations that maximize the exposure of virgin harmful gases to the catalytic surfaces in the catalytic core. The catalytic core structure can be deployed in any catalytic conversion process. In various embodiments, the structures can be used in internal combustion engines including those employing the Otto cycle and diesel type engines.

In various embodiments, the convertor core is made from catalyzed pleated surfaces situated in a conical array. Each of the catalytic surfaces has a plurality of openings therein that form fluid flow paths.

BRIEF DESCRIPTION OF THE DRAWINGS

The accompanying drawings, wherein like reference numerals refer to identical or functionally similar elements throughout the separate views, together with the detailed description below, illustrate embodiments of concepts that include the claimed disclosure, and explain various principles and advantages of those embodiments.

DETAILED DESCRIPTION

The present disclosure is generally directed to configurations of catalytic surfaces that are utilized to convert harmful exhaust gases to harmless gases in a more efficient manner and at a lower cost than current art devices. The configurations of catalytic surfaces disclosed herein result in more efficient conversion of harmful exhaust gases to harmless gases both during normal operation and warmup. Catalytic materials are much more efficient at converting harmful gasses at elevated temperatures. The reduced mass and the fluidic architecture disclosed herein result in catalytic convertor devices that require significantly less time to reach efficient conversion temperatures. The lower cost of the devices is due in part to a reduction in the mass of the devices and also to the more efficient utilization of the precious metals used in the catalytic converter core devices.

Figure 1:
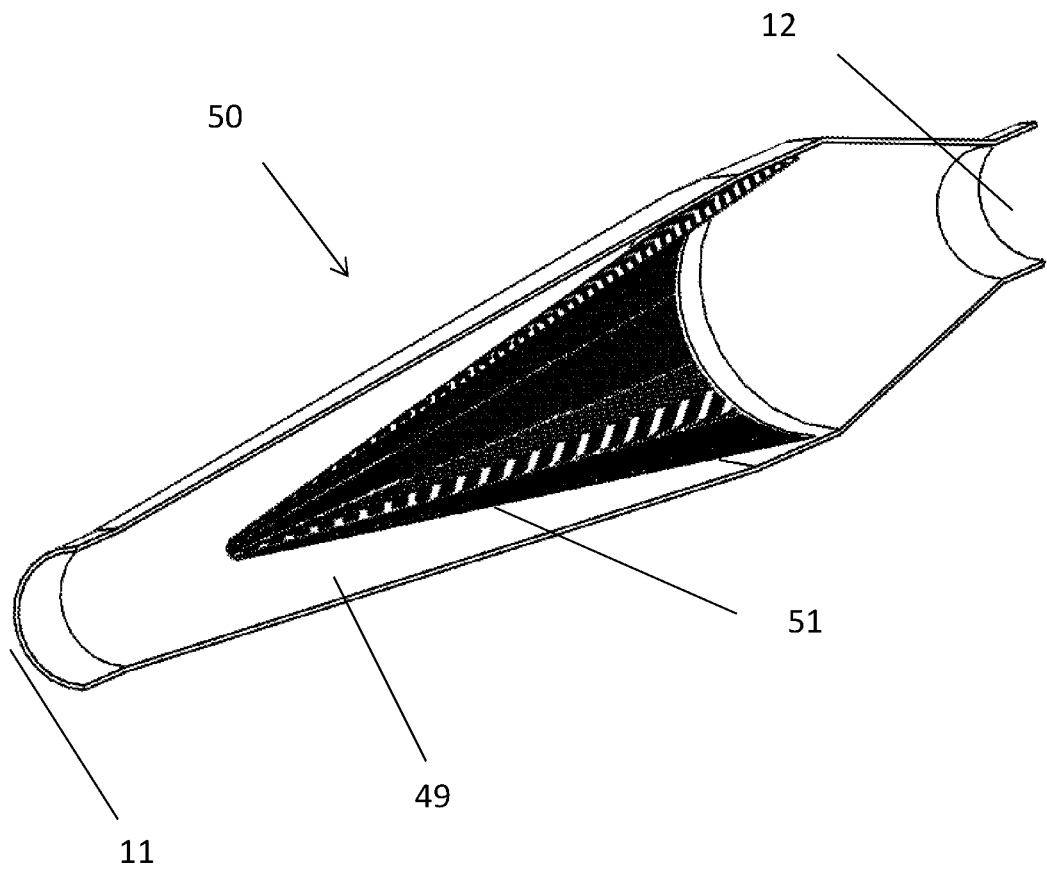
FIG. 1 is a sectioned perspective view of a catalytic converter assembly.

Referring first to FIG. 1, a catalytic converter assembly 50 is shown with an inlet 11 through which exhaust gases from an internal combustion engine enter the catalytic converter assembly 50. A converter housing 49 directs the inlet gases through a conical catalytic panel 51. A catalytic core of the catalytic converter assembly 50 has openings that form fluid flow paths. The openings are staggered from the inlet side to the outlet side of the assembly 50 so that no fluid flow path is a straight line. This maximizes exposure of inlet harmful gases to catalytic surfaces by minimizing a boundary layer and providing configurations that maximize the exposure of virgin harmful gases to the catalytic surfaces in the catalytic core.

Exhaust gases from internal combustion engines typically contain a small amount of gases that are harmful to humans and the environment. When the catalytic converter assembly 50 is cold, the harmful exhaust gases can pass thought the catalytic converter assembly 50 without being converted to harmless gases. The gases exit the catalytic converter assembly 50 at the outlet 12. When the conversion components within the catalytic converter assembly 50 reach operational temperature, a significant fraction of the harmful exhaust gases are converted to harmless gases.

Figure 2A:
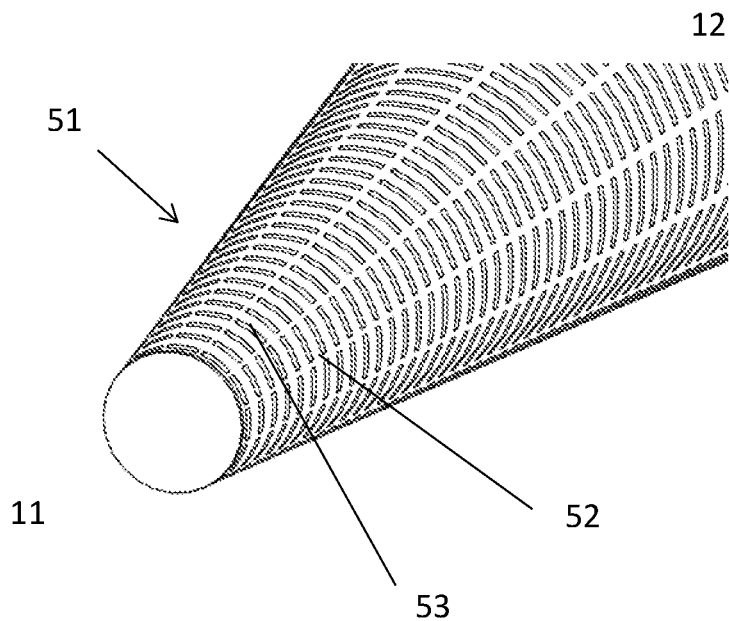
FIGS. 2a and 2b are closeups views of the converter core utilized in the converter illustrated in FIG. 1.
Figure 2B:
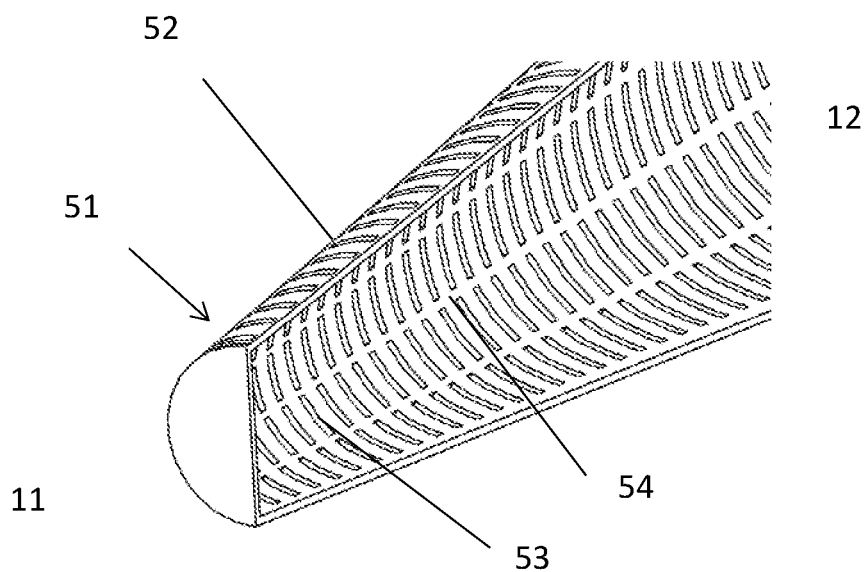

Referring to FIGS. 2a-b, the details of the construction of the conical catalytic panel 51 can be seen. The surface of the conical catalytic panel 51 is populated with panel openings 53. The panel openings 53 allow exhaust gases to flow from one side of the conical catalytic panel 51 to an opposite side. All of the surfaces of the conical catalytic panel 51 are coated with a catalytic conversion material. Those skilled in the art would recognize that many catalytic materials would be suitable for the coating material.

The catalytic material is typically a precious metal carried in a porous ceramic material called a washcoat. Washcoats comprise a porous ceramic material to create maximum surface area to act as a carrier for the actual catalytic material. Some examples known to those skilled in the art of washcoat materials are aluminum oxide, titanium dioxide and silicon dioxide, or a mixture of silica and alumina. Some known catalytic materials are platinum, palladium, rhodium, etc. The engineering of the specific catalytic material used for catalytic conversion is not discussed herein, inasmuch as one skilled in the art of catalytic conversion materials and their reaction with exhaust gases could apply the known art to any of the fluidic structures described in this disclosure.

Nearly all of the exhaust gases that flow through the conical catalytic core 51 are converted from harmful gases to harmless gases (presuming an operable temperature range in the catalytic core) as the inlet gases react with the catalytic material on the surfaces of the conical catalytic panel 51.

Figure 3:
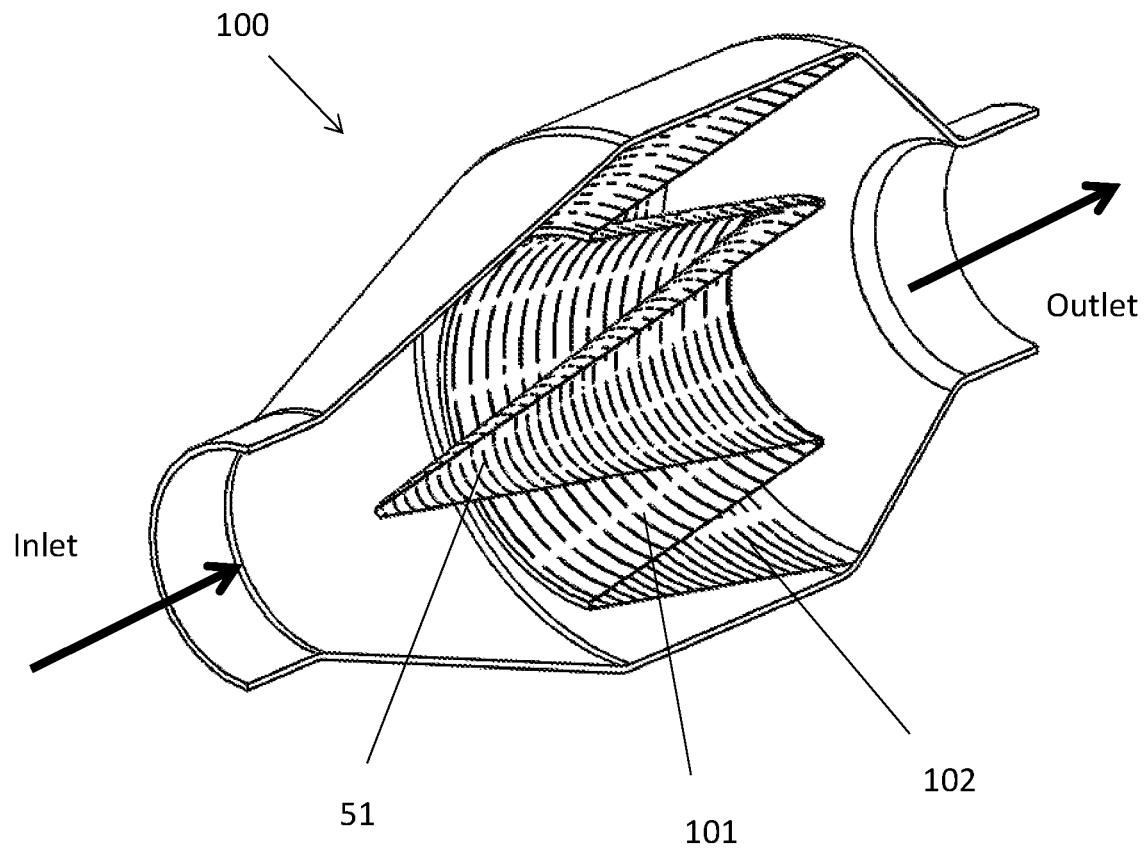
FIG. 3 is a section perspective view of an alternate embodiment of the catalytic core illustrated in FIG. 1.

FIG. 3 shows an alternate structure of a conical converter panel 51. The conical catalytic panel 51 is folded back onto itself at the juncture of conical catalytic panel 51 and a first zigzag conical pane 101. The first zigzag conical pane 101 then folds again to extend to a second zigzag conical pane 102. The zigzag configuration of conical catalytic converter panel 51 provides the convertor with more catalytic surface available in a given volume of housing.

Figure 4:
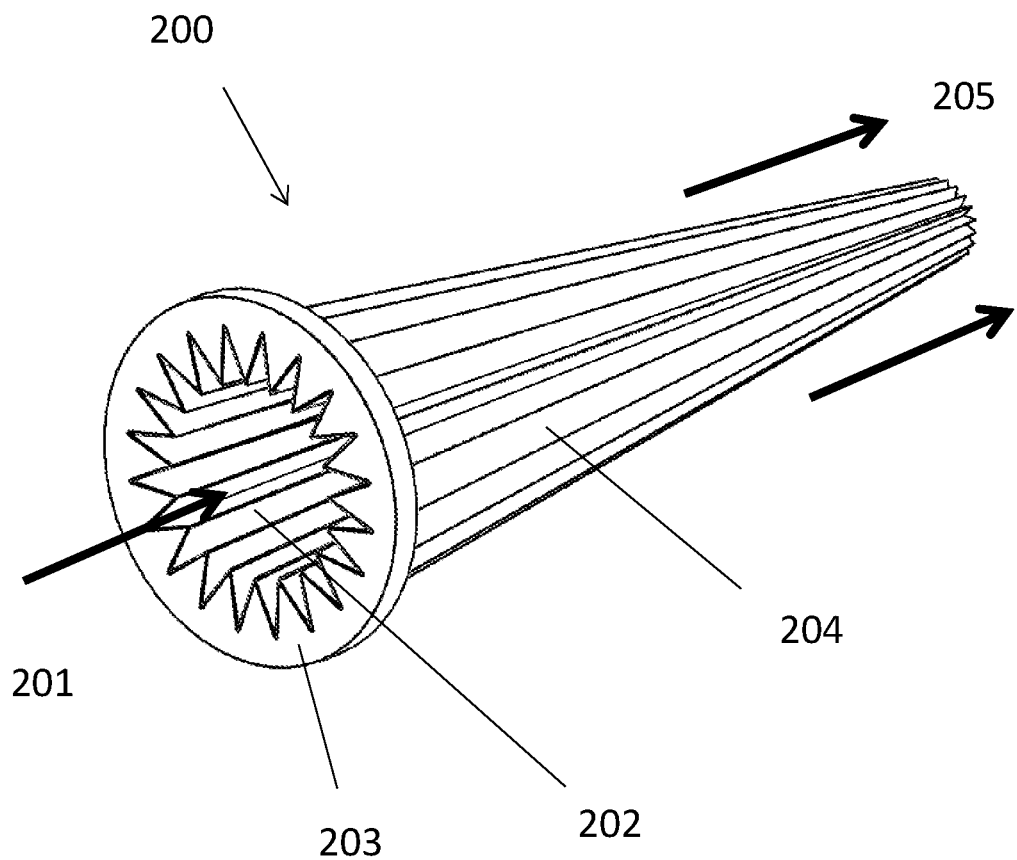
FIG. 4 is a perspective view of a pleated catalytic converter core in accordance with an embodiment of the present disclosure.
Figure 5:
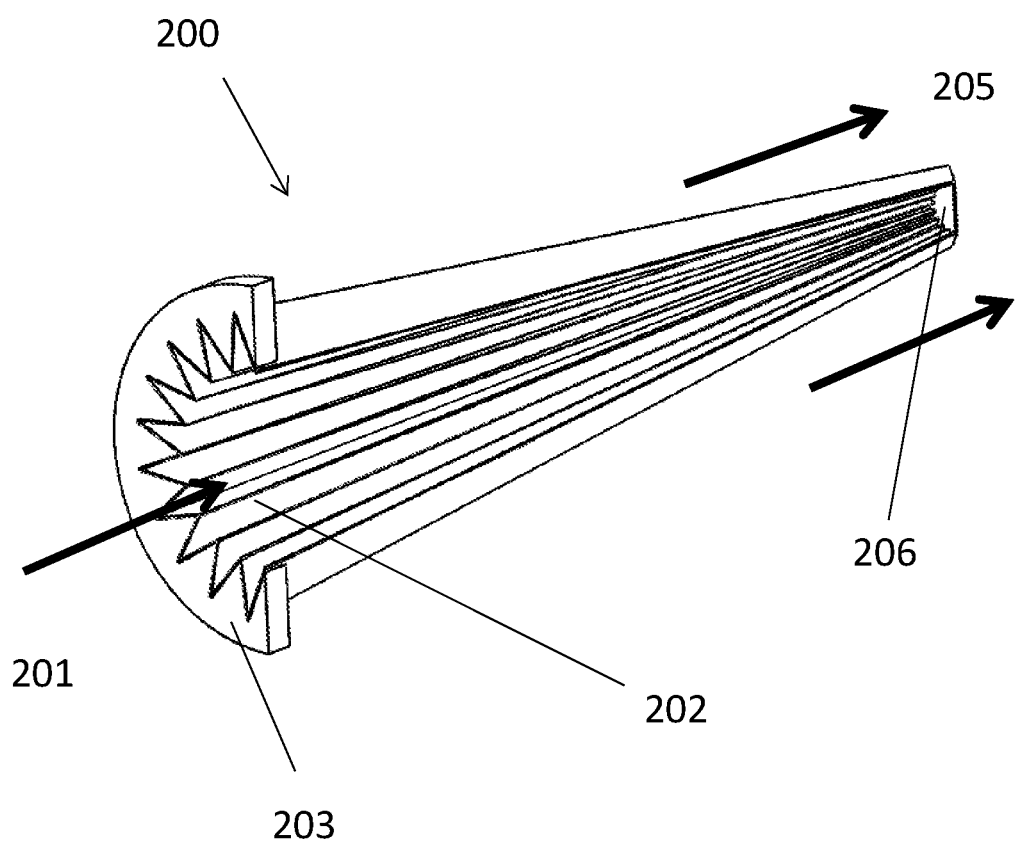
FIG. 5 is a sectional view of the catalytic converter core shown in FIG. 4, illustrating the interior components.
Figure 6:
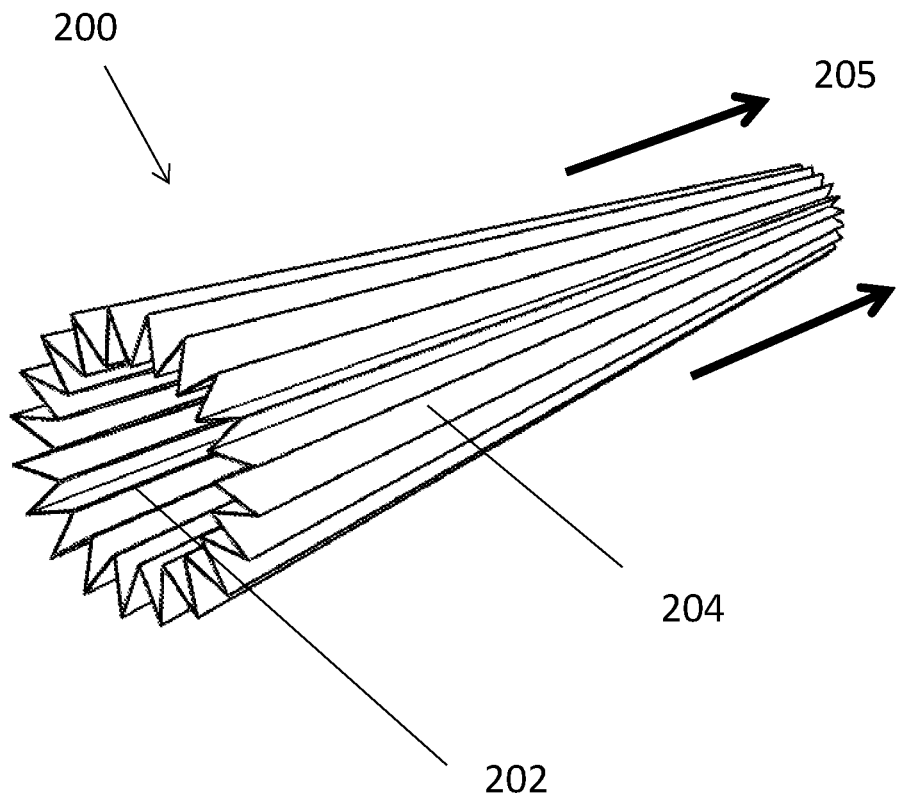
FIG. 6 is a modified section view of the pleated catalytic converter core that excludes the plate portion illustrated in FIG. 4 showing the interior components.

Referring now to FIGS. 4, 5 and 6, a structure for a pleated conical catalytic converter core 200 is illustrated. Exhaust gases enter an inlet 201 of the pleated conical catalytic converter core 200 at a first end, and exit through an outlet 205 at a second end of the pleated catalytic converter core 200. As with all catalytic converter cores, the gases flow through the porous material 202 to effect the conversion process. The porous material 202 is pleated to form a conical array to increase the amount of material that can be used in a given volume of housing, and thereby increase the number of pores in the catalytic material that are available for the conversion process. The greater surface area increases the rate of catalytic conversion by reducing the velocities of the gas flows over the surfaces and through the pores of the porous material 202.

To ensure that exhaust gases do not bypass the porous material 202, end plate 203 is mated to the porous material 202. End plate 203 is sized to fill the inlet of the housing (not shown) so that the exhaust gas is forced to flow over the porous catalytic material 202. The end plate 203 ensures that all of the exhaust gas flows through the pleated conical catalytic converter core 200. The outside surface of the plate 203 seals against the inside of the housing in practice.

FIG. 5 shows an end plug 206. The end plug 206 is attached to the porous catalytic pleated material 202. The end plug 206 mates with an outlet end of the housing. The end plug 206 restricts exhaust gases from bypassing the porous catalytic material 202 at the end of the pleated conical catalytic converter core 200. The end plug 206 may include catalytic surfaces with porous material 202.

FIG. 6 shows the relative thickness of the pleats in the catalytic porous material 202 in relation to the pleated conical catalytic converter core 200. The thickness of the pleats may be varied according to the requirements of a given application.

Figure 7A:
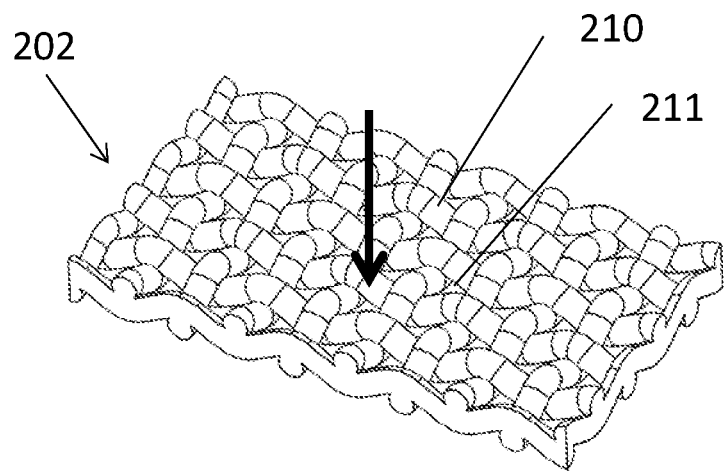
FIGS. 7a, 7b and 7c show detail views of various alternative constructions that can be used for the catalytic core surface.
Figure 7B:
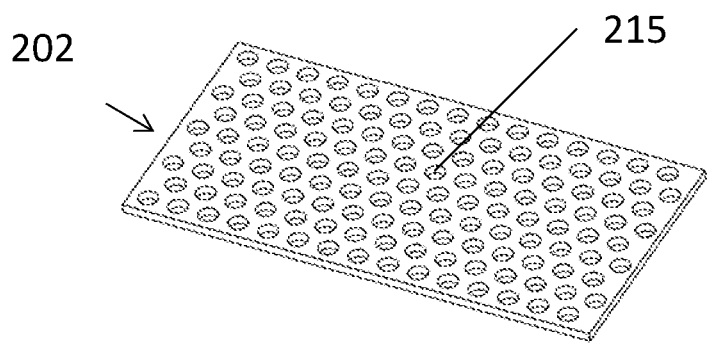
Figure 7C:
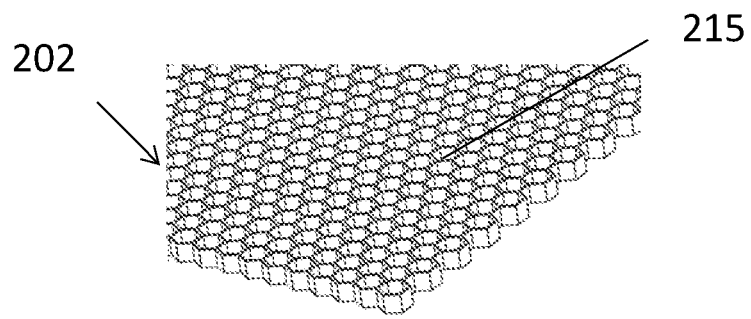

FIGS. 7a-c show various types of porous materials that can be utilized in the pleated conical catalytic converter core 200. Specifically, FIG. 7a shows a woven wire screen 210 that forms channels 211 in the porous catalytic material 202. FIG. 7b shows a flat sheet with round holes 215. The holes 215 could be square or any other shape desired by a user. FIG. 7c illustrates the use of a honeycomb type material 215. Another example of a suitable porous material is a randomly porous sponge type material made from a high temperature material. One skilled in the art of porous materials suitable for high temperature catalytic conversion could engineer the proper material for a given application.

Figure 8:
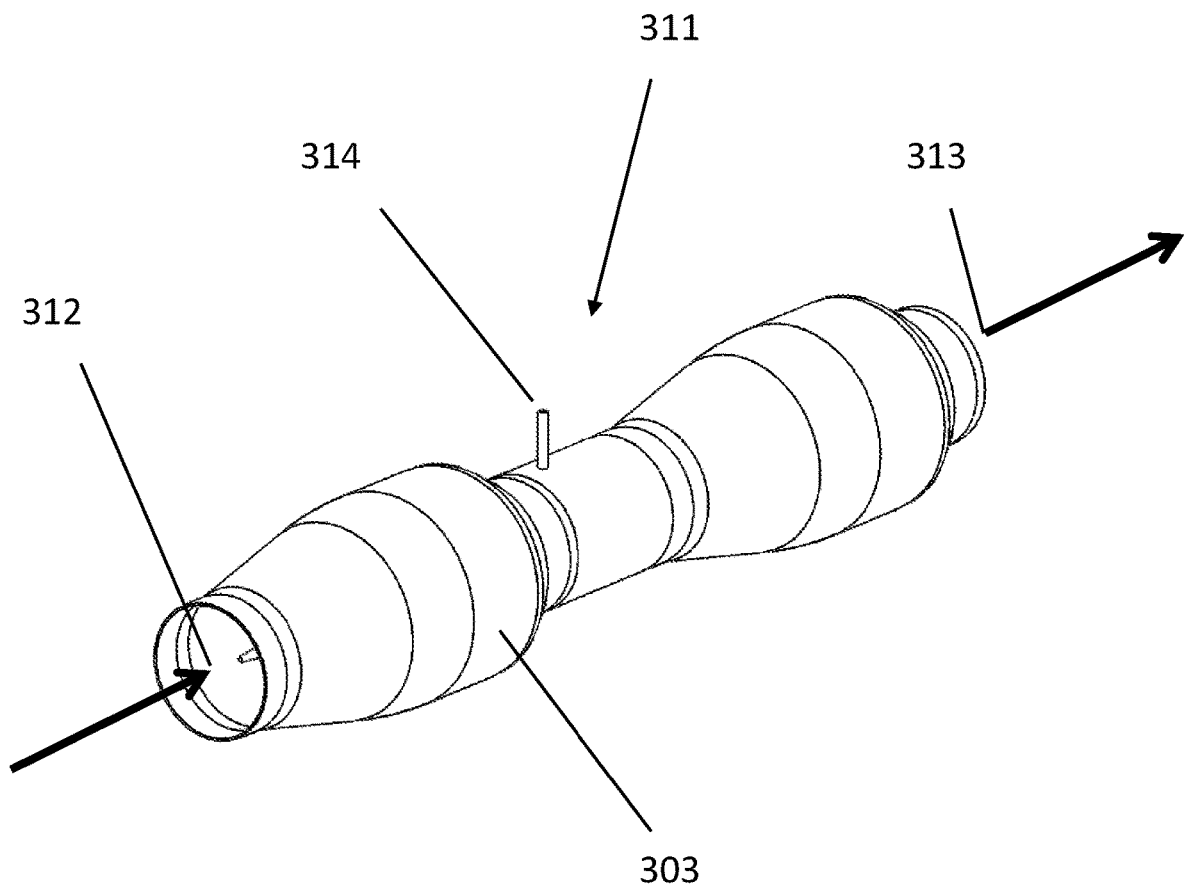
FIG. 8 is a perspective view of a catalytic converter system configured for use in a diesel engine.
Figure 9:
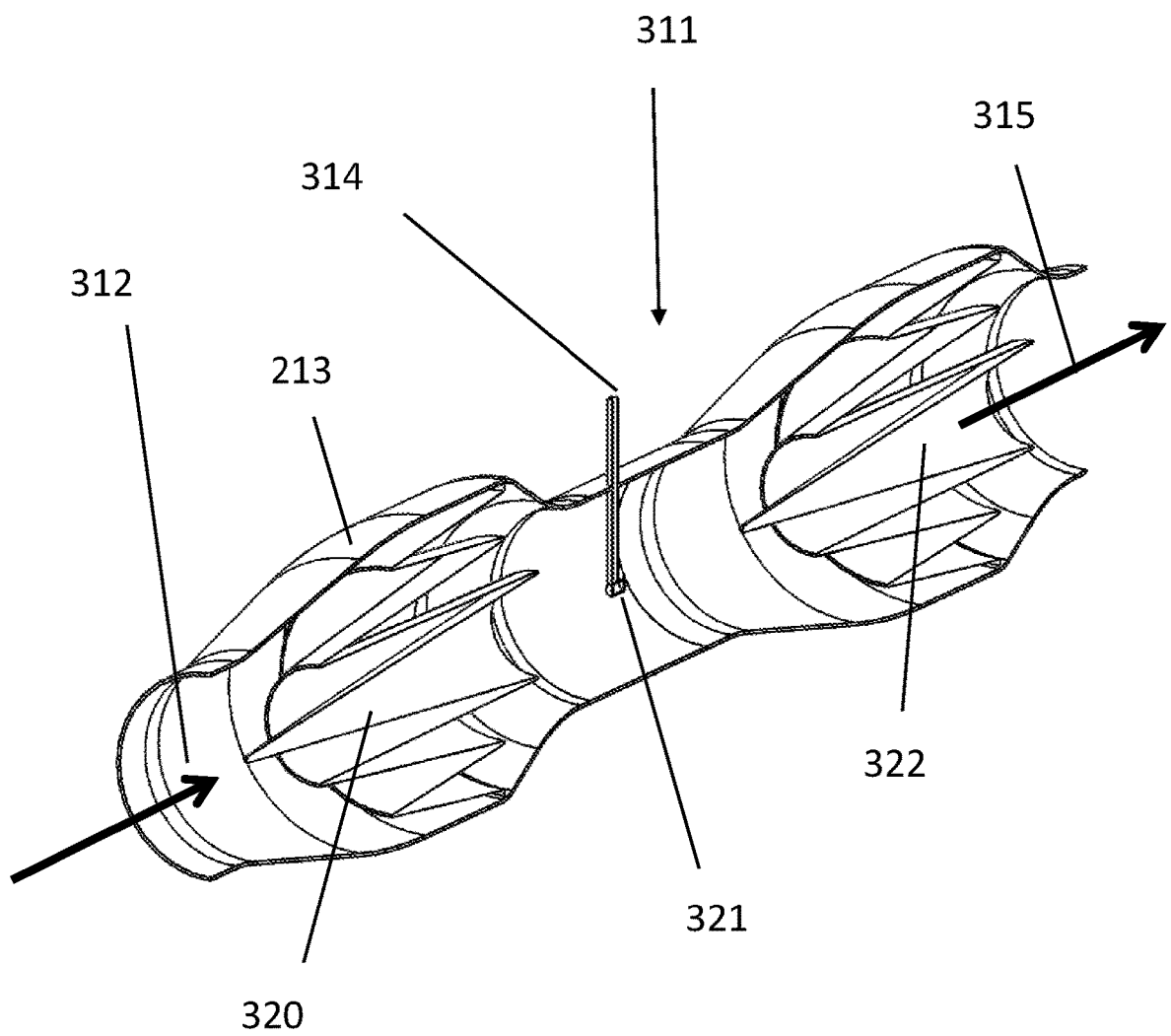
FIG. 9 is a sectional view of the catalytic converter core of FIG. 8 showing the internal components of the core.
Figure 10:
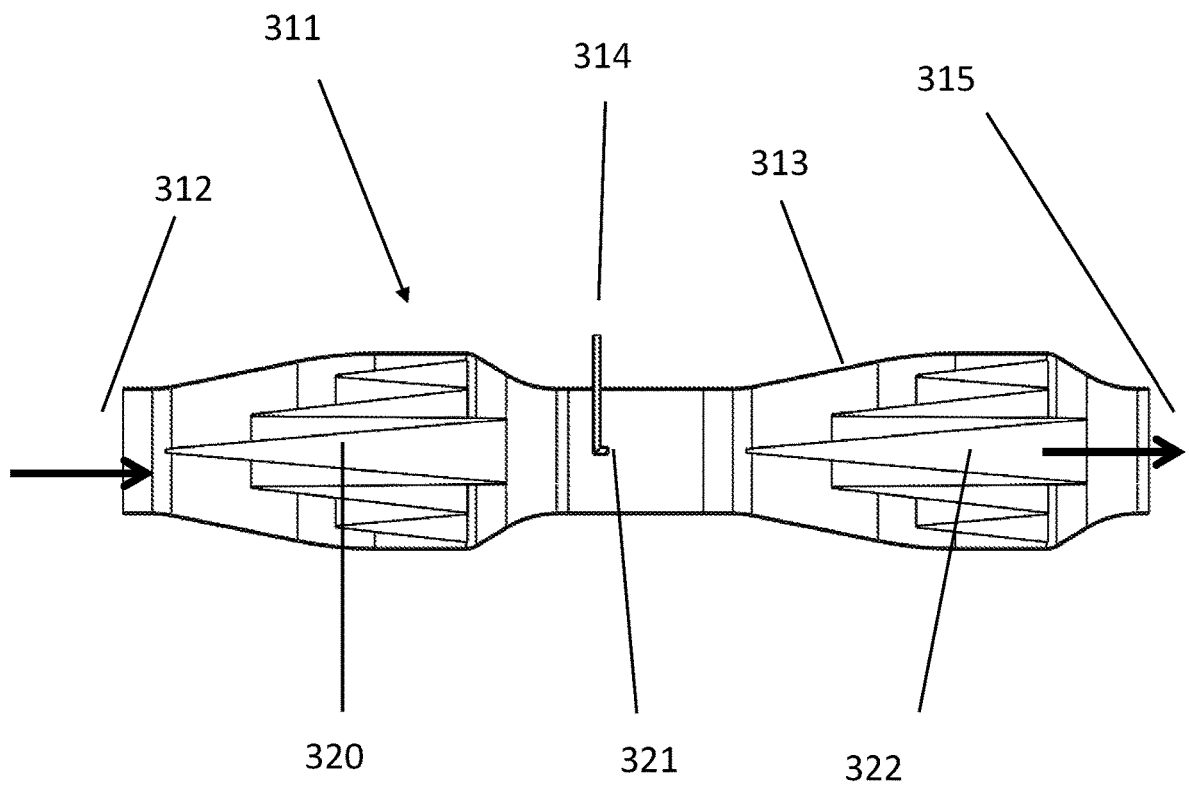
FIG. 10 is another sectional view of the catalytic converter core depicted in FIG. 8.
Figure 11:
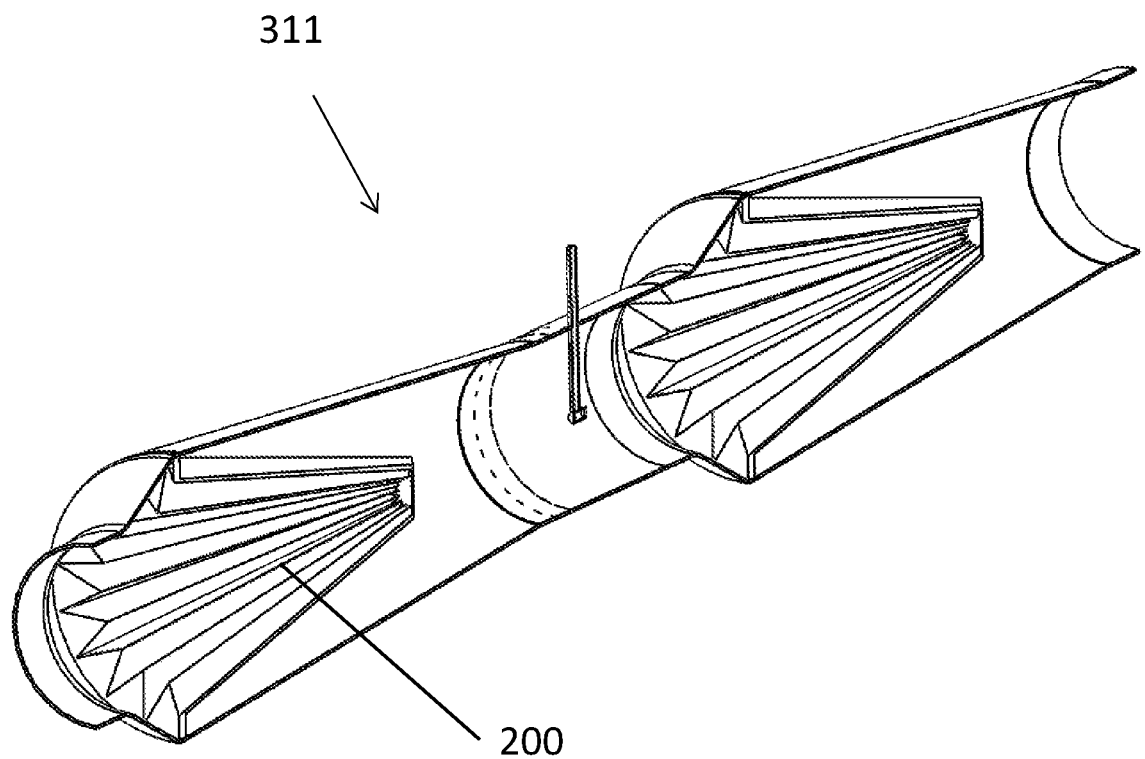
FIG. 11 show an alternate embodiment of the diesel catalytic converter system shown in FIGS. 8-10.

FIGS. 8, 9, 10, and 11 illustrate catalytic cores configured to be utilized for diesel engine emissions control. FIGS. 8, 9, and 10 show diesel emissions control systems 311 that include a zig zag conical catalytic convertor core 101. FIG. 11 shows a diesel emissions system 311 with a pleated conical catalytic converter core 200.

FIG. 9 shows a sectional view to illustrate the internal components of a catalytic convertor adapted for a diesel engine. Two catalytic cores are required for a converter for a diesel engine. The first core in the flow path is the DOC ("diesel oxidation catalyst") 320. The DOC 320 converts a large portion of the CO and the hydrocarbons in the engine exhaust to $CO_2$ and $H_2O$. The DOC 320 does not significantly convert the $NO_x$. The $NO_x$ gases are converted in the second core, SCR ("selective catalytic reduction") 322. SCR 322 converts a significant portion of the $NO_x$ gases to harmless gases. To accomplish this task a reducing agent, DEF ("diesel exhaust fluid") is added upstream of the core to trigger the catalytic conversion reaction at the SCR 322 core. The DEF reducing agent is typically a urea solution that is mixed in the exhaust stream upstream from the SCR 322 and downstream from the DOC 320. The DEF is introduced into the catalytic converter system via a DEF nozzle 321 that includes a DEF inlet 314.

Figure 12:
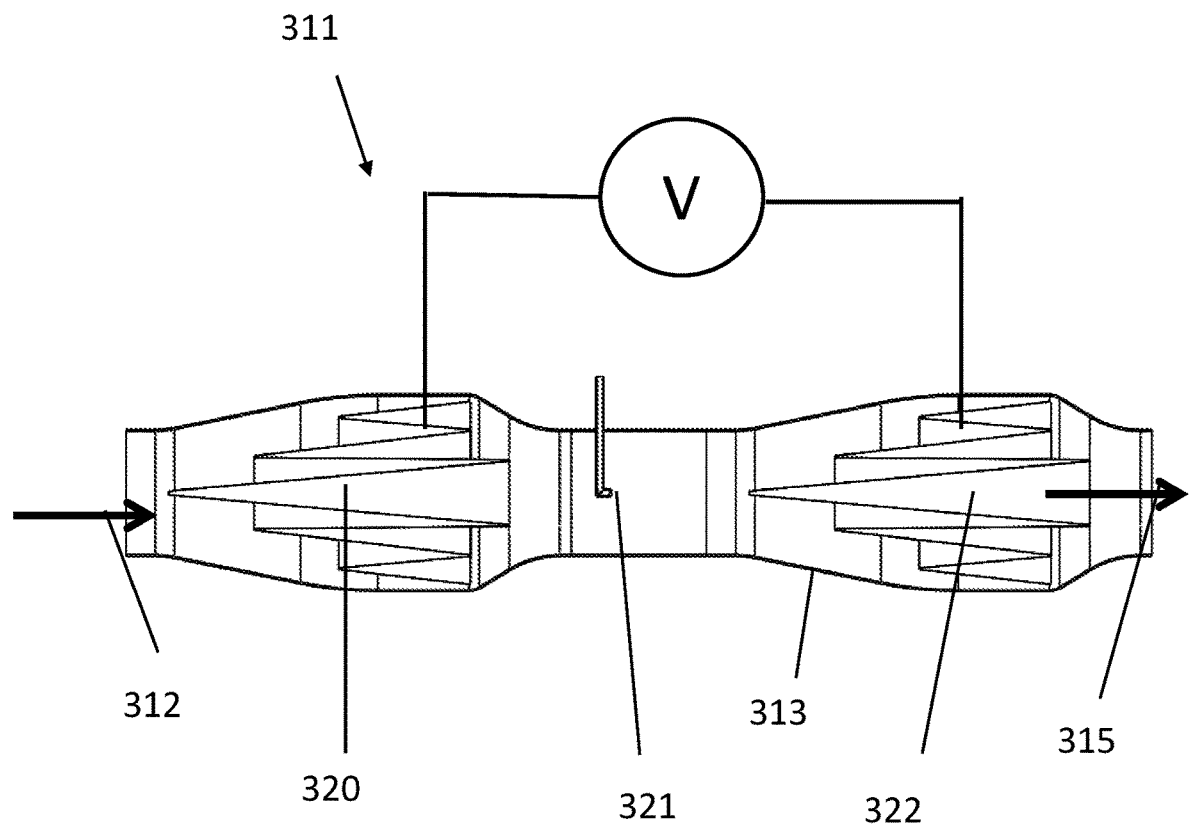
FIG. 12 is a side view of the diesel catalytic converter showing the application of an electric potential.

FIG. 12 illustrates a diesel emissions control system 311 with an electric field applied to the catalytic cores DOC 320 and SCR 322. By applying a high voltage to the two cores DOC 320 and SCR 322, particulate matter that passes through the first core DOC 320 is induced with an electrical charge. The charged particles are attracted to the surfaces of the second core SCR 322 that is charged with an opposite charge. In this case both of the cores DOC 320 and SCR 322 would be fabricated from a material that can maintain a surface charge. Typically, this would require the cores DOC 320 and SCR 322 to be conductive at least to some degree.

Figure 13:
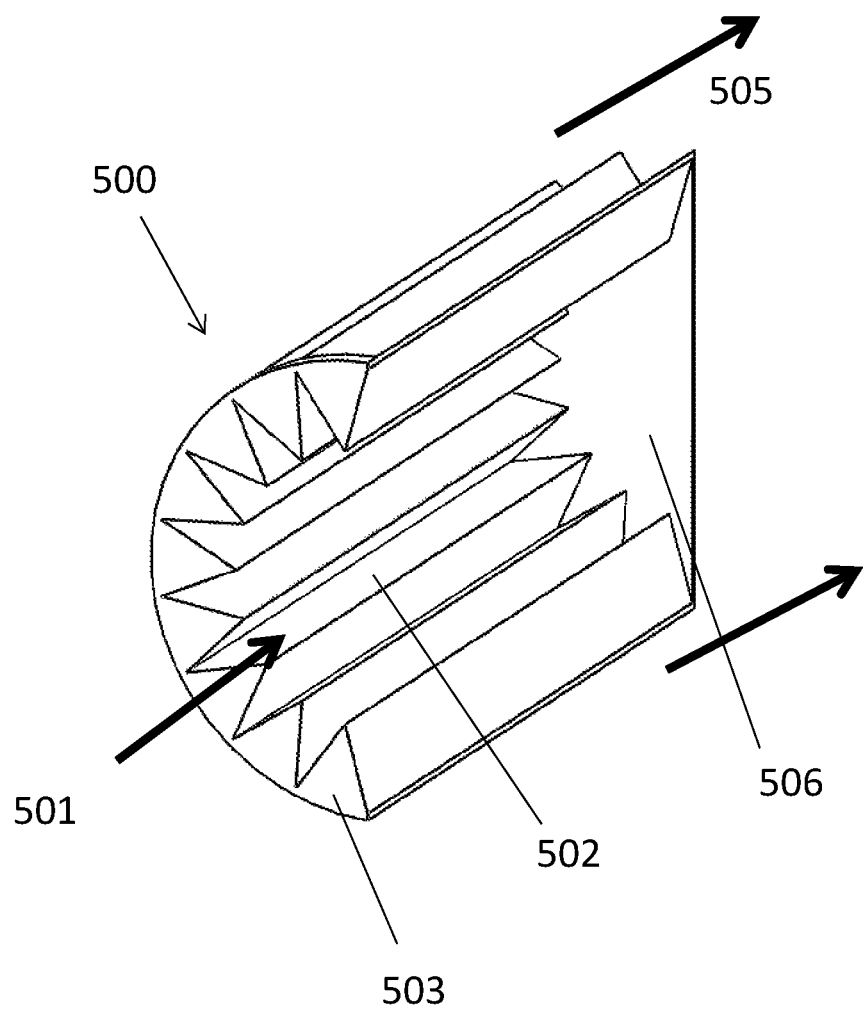
FIG. 13 is a sectioned perspective view of an alternate embodiment of a pleated catalytic converter core.

FIG. 13 shows an emissions control system 311 with a pleated cylindrical core 500. In this configuration, the core 500 is cylindrical as opposed to conical in shape. This alternate configuration is not generally as space efficient as the standard conical embodiments, but in some applications, it may be preferred. With this embodiment the end plug 506 might be fabricated from porous material.

Figure 14:
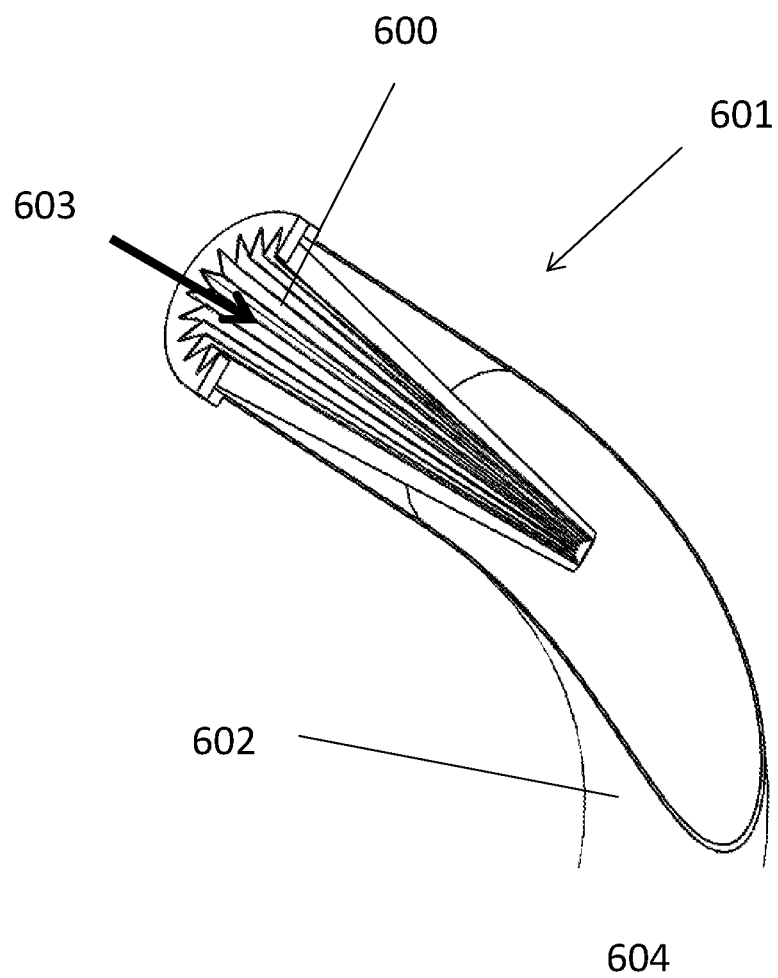
FIG. 14 shows an embodiment of the catalytic converter core positioned in the cylinder head of an engine.

Referring now to FIG. 14, the pleated conical core 600 (similar to that shown in FIG. 4) is shown deployed in a tailpipe 602. This would be the preferred location for a motorcycle application. The flange of the inlet 603 of the core 600 and the flange of the tailpipe 602 are mated directly to the cylinder head of the engine, not shown. Note that the core 600 and the tailpipe 602 might share a common flange. This deployment of the core 600 results in a short warmup time and doesn't require any additional parts. A conical catalytic panel 51 could alternately be deployed.

The technology disclosed herein addresses improved configurations for catalytic convertors. The improvements disclosed are independent of the actual catalytic material used for the catalytic conversion. There are a myriad of choices that would suffice as the material from which to form the catalytic cores described. Porous metal, screens, fiberglass, or porous ceramic materials could be deployed to create a catalytic core embodying the teachings of this disclosure—keeping the boundary layer to a minimum while facilitating virgin harmful gases being brought into contact with the catalytic surfaces. Further, the type of material used to create the catalytic cores is not limited to ceramics or metals. Glass or other materials that can withstand high operating temperatures could also be deployed. Cores with square or round holes—indeed openings of nearly any conformation—could as well be deployed. It should be noted that in general, smaller core openings, smaller pitch, and thinner thickness of material deliver improved performance. Thinner material typically leads to less mass in the device. Less mass relates to lower weight, cost of manufacturing, and faster warmup of the catalytic surfaces. Smaller pores with smaller pitch results in lower overall velocity between the pores which lead to greater conversion rates. It should be self-evident that one skilled in the art of catalytic materials could engineer a specific catalytic material to be installed in a catalytic convertor to be used in a given application.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A catalytic convertor device, comprising:
   a housing with an inlet and an outlet, the housing being conical in configuration;
   a catalytic convertor core with an inlet and an outlet, the catalytic convertor core being formed from a gas permeable material, wherein the catalytic convertor core is longitudinally pleated to create a plurality of pleats of the gas permeable material inside the housing;
   an end plug attached to the outlet of the catalytic convertor core to restrict gas from bypassing the gas permeable material, the end plug having a surface coated with the gas permeable material, the surface being faced towards the catalytic convertor core; and
   an end plate attached to the inlet of the catalytic convertor core and contacting the housing, the end plate being configured to force the gas to flow through the gas permeable material and restrict the gas from going into a space between the housing and the inlet of the catalytic convertor core and bypassing the gas permeable material.

2. The catalytic convertor device of claim 1, wherein the catalytic convertor core is conical in configuration.

3. The catalytic convertor device of claim 1, wherein the catalytic convertor core is cylindrical in configuration.

4. The catalytic convertor device of claim 1, wherein the pleated elements comprise a plurality of openings.

5. The catalytic convertor device of claim 1, wherein the catalytic convertor core is formed from a precious metal.

6. The catalytic convertor device of claim 1, wherein the catalytic convertor core is formed from a porous metal.

7. The catalytic convertor device of claim 1, wherein the catalytic convertor core is formed from a screen.

8. The catalytic convertor device of claim 1, wherein the catalytic convertor core is formed from porous fiberglass.

9. The catalytic convertor device of claim 1, wherein the catalytic convertor core is formed from a ceramic material.

10. The catalytic convertor device of claim 1, wherein the catalytic convertor core is formed from glass.

11. A catalytic convertor device, comprising:
    a housing with an inlet and an outlet, the housing being conical in configuration;
    a catalytic convertor core with an inlet and an outlet, the catalytic convertor core comprising openings therein that form fluid flow paths, the openings being staggered from the inlet to the outlet so that no fluid flow path is a straight line, the catalytic convertor core being longitudinally pleated to create a plurality of pleats inside the housing;
    an end plug attached to the outlet of the catalytic convertor core to restrict gas from bypassing the gas permeable material, the end plug having a surface coated with the gas permeable material, the surface being faced towards the catalytic convertor core; and
    an end plate attached to the inlet of the catalytic convertor core and contacting the housing, the end plate being configured to force the gas to flow through the gas permeable material and restrict the gas from going into a space between the housing and the inlet of the catalytic convertor core and bypassing the gas permeable material.

12. The catalytic convertor device of claim 11, wherein the catalytic convertor core is conical in configuration.

13. The catalytic convertor device of claim 11, wherein the catalytic convertor core is cylindrical in configuration.

14. The catalytic convertor device of claim 11, wherein the pleated elements comprise a plurality of openings.

15. The catalytic convertor device of claim 11, wherein the catalytic convertor core is formed from a precious metal.

16. The catalytic convertor device of claim 11, wherein the catalytic convertor core is formed from a porous metal.

17. The catalytic convertor device of claim 11, wherein the catalytic convertor core is formed from a screen.

18. The catalytic convertor device of claim 11, wherein the catalytic convertor core is formed from porous fiberglass.

19. The catalytic convertor device of claim 11, wherein the catalytic convertor core is formed from a ceramic material.

20. The catalytic convertor device of claim 11, wherein the catalytic convertor core is formed from glass.

\* \* \* \* \*